(12) United States Patent
Gladkikh et al.

(10) Patent No.: US 12,339,129 B2
(45) Date of Patent: Jun. 24, 2025

(54) METHODS AND SERVERS FOR GENERATING A PREDICTION SCORE BY A MACHINE LEARNING ALGORITHM

(71) Applicant: Yandex.Taxi LLC, Moscow (RU)

(72) Inventors: Ekaterina Gladkikh, Moscow (RU); Dmitry Shulchevskiy, Ryazan (RU)

(73) Assignee: Y.E. Hub Armenia LLC, Yerevan (AM)

( * ) Notice: Subject to any disclaimer, the term of this patent is extended or adjusted under 35 U.S.C. 154(b) by 144 days.

(21) Appl. No.: 18/241,834

(22) Filed: Sep. 1, 2023

(65) Prior Publication Data

US 2024/0077318 A1 Mar. 7, 2024

(30) Foreign Application Priority Data

Sep. 5, 2022 (RU) .......................... RU2022123664

(51) Int. Cl.
*G01C 21/34* (2006.01)
(52) U.S. Cl.
CPC ..... *G01C 21/3446* (2013.01); *G01C 21/3461* (2013.01)
(58) Field of Classification Search
None
See application file for complete search history.

(56) References Cited

U.S. PATENT DOCUMENTS

| | | | |
|---|---|---|---|
| 8,315,792 B2 | 11/2012 | Speier et al. | |
| 8,606,512 B1 | 12/2013 | Bogovich et al. | |
| 8,612,139 B2 | 12/2013 | Wang et al. | |
| 9,898,759 B2 | 2/2018 | Khoury | |
| 9,927,252 B1 | 3/2018 | Chokshi et al. | |
| 9,932,033 B2 | 4/2018 | Slusar et al. | |
| 10,096,038 B2 | 10/2018 | Ramirez et al. | |
| 10,152,053 B1 | 12/2018 | Smith et al. | |

(Continued)

FOREIGN PATENT DOCUMENTS

| | | |
|---|---|---|
| CN | 112749819 A | 5/2021 |
| CN | 113283548 B | 10/2021 |

(Continued)

OTHER PUBLICATIONS

Russian Search Report dated Nov. 7, 2024 issued in respect of the counterpart Russian Patent Application No. RU 2022123664.

(Continued)

*Primary Examiner* — Ryan Rink
(74) *Attorney, Agent, or Firm* — BCF LLP

(57) ABSTRACT

A method and server for generating a prediction score by a Machine Learned Algorithm (MLA). The method includes: acquiring route data, generating a plurality of route scores for the plurality of routes based on the route data, acquiring driver data, generating a plurality of driver scores for the plurality of drivers based on the driver data, and for a given route-driver pair: generating by the MLA a given prediction score indicative of a likelihood of the given driver having an accident on the given route within a predetermined amount of time after initiating the given route. The method also includes assigning, by employing a dispatching algorithm based on the prediction score, the given route to the given driver for providing a transportation service to the user.

15 Claims, 6 Drawing Sheets

(56) References Cited

U.S. PATENT DOCUMENTS

| | | |
|---|---|---|
| 10,157,422 B2 | 12/2018 | Jordan Peters et al. |
| 10,204,528 B2 | 2/2019 | Truong et al. |
| 10,650,618 B2 | 5/2020 | Li |
| 10,733,460 B2 | 8/2020 | Heck et al. |
| 10,883,850 B2 | 1/2021 | Guidotti et al. |
| 10,960,893 B2 | 3/2021 | Chowdhury et al. |
| 11,335,200 B2 | 5/2022 | Tong et al. |
| 2006/0247852 A1 | 11/2006 | Kortge et al. |
| 2009/0210142 A1 | 8/2009 | Couckuyt et al. |
| 2011/0106370 A1 | 5/2011 | Duddle et al. |
| 2015/0081362 A1 | 3/2015 | Chadwick et al. |
| 2017/0091677 A1 | 3/2017 | Andreev et al. |
| 2017/0206622 A1 | 7/2017 | Pavlov et al. |
| 2020/0003569 A1 | 1/2020 | Polanowski |
| 2020/0082721 A1* | 3/2020 | Chen ..................... G08G 1/16 |
| 2020/0160251 A1 | 5/2020 | Wynter et al. |
| 2020/0286003 A1 | 9/2020 | Nagarajan et al. |
| 2020/0286310 A1 | 9/2020 | Carver et al. |
| 2020/0318983 A1* | 10/2020 | Shirani-Mehr ........ G06V 20/56 |
| 2020/0334762 A1 | 10/2020 | Carver et al. |
| 2020/0339159 A1 | 10/2020 | Zhong et al. |
| 2020/0393257 A1 | 12/2020 | Dryjanski et al. |
| 2020/0408540 A1* | 12/2020 | Schreier ............. G01C 21/3484 |
| 2021/0005087 A1 | 1/2021 | Felt et al. |
| 2021/0164792 A1* | 6/2021 | Pal ..................... G01C 21/3453 |
| 2022/0065639 A1* | 3/2022 | Mistele .............. G01C 21/3446 |
| 2022/0270177 A1* | 8/2022 | Chintakindi .......... H04W 4/029 |
| 2022/0276063 A1* | 9/2022 | Berman ............. G01C 21/3691 |
| 2024/0085193 A1* | 3/2024 | Tisseur ............. G01C 21/3469 |

FOREIGN PATENT DOCUMENTS

| | | |
|---|---|---|
| CN | 113743767 A | 12/2021 |
| CN | 114187072 A | 3/2022 |
| DE | 102012220146 A1 | 5/2014 |
| DE | 102017009518 A1 | 3/2018 |
| RU | 2308385 C2 | 10/2007 |
| RU | 2696323 C2 | 8/2019 |
| RU | 2754066 C2 | 8/2021 |
| WO | 2016135561 A1 | 9/2016 |

OTHER PUBLICATIONS

Notice of Allowance and search report dated Apr. 23, 2025 issued in respect of the counterpart Russian Patent Application No. RU 2022133958.

* cited by examiner

METHODS AND SERVERS FOR GENERATING A PREDICTION SCORE BY A MACHINE LEARNING ALGORITHM

CROSS-REFERENCE

The present application claims priority to Russian Patent Application No. 2022123664, entitled "Methods and Servers for Generating a Prediction Score by a Machine Learning Algorithm", filed Sep. 5, 2022, the entirety of which is incorporated herein by reference.

FIELD OF TECHNOLOGY

The present technology relates to Machine Learning (ML) and, specifically, to methods and servers for generating a prediction score by a Machine Learning Algorithm (MLA).

BACKGROUND

Recent developments in the field of transportation services have led to evolution of various online platforms that cater to travelling requirements of passengers. Specifically, transportation platforms that offer on-demand vehicle services to the passengers have emerged as a popular solution to overcome the ever-increasing demand for the transportation services. Such online platforms are operated by ridesharing companies and offer, via a website and/or a mobile app, a "ride" for a user of the online platform.

Typically, a passenger initiates a ride request to travel from a pick-up location to a drop-off location. A computer-implemented system of the ridesharing platform processes the ride request and allocates a suitable vehicle to cater to the ride request. A variety of factors may affect allocation of a vehicle to a ride request.

For example, the allocation may be performed while considering whether a given driver of a candidate vehicle has already driven for a long duration and is currently exhausted. This may adversely affect the driving capability of the driver and the travel experience of the passenger. In another example, the allocation may be performed while considering weather and road conditions that may, or may not, be favourable for the driver to drive the vehicle. Although significant efforts are made by ridesharing companies to offer safe and comfortable transportation services, further improvements may be desired.

U.S. Pat. No. 9,927,252 discloses a navigation system for identifying routes that take safety considerations into account.

SUMMARY

It is an object of the present technology to ameliorate at least some of the inconveniences present in the prior art. Embodiments of the present technology may provide and/or broaden the scope of approaches to methods of achieving the aims and objects of the present technology. Developers of the present technology have appreciated at least one technical problem associated with the prior art approaches.

Ridesharing companies such as, for example, Uber™, Lyft™, and Yandex.Taxi™, operate online systems that aim to provide safe and comfortable transportation services to their users. A given online ridesharing system comprises a "dispatching algorithm" for matching users and drivers based on a plurality of factors. The factors can include inter-alia driver-specific factors, user-specific factors, and ride-specific factors. For example, one of the factors that can be used is the amount of time that it takes for a candidate driver to arrive to a pick-up location of the user. Using such a factor may reduce "idle time" of drivers of the ridesharing platform during which the drivers are currently connected and available for accepting a ride but without being matched with one by the dispatching algorithm.

For example, a user can initiate a ride request by pressing a "call a vehicle" button of a mobile app on a frontend of the ridesharing platform. In response, an order "object" can be generated and processed by a server on a backend of the ridesharing platform.

In some embodiments, an order object may be embodied and implemented as a respective State Machine (SM) processed on the backend of a given ridesharing platform. In these embodiments, in order to transition a given order object SM from a "pending" state to "driver assigned" state, the backend can be configured to (i) select a candidate driver from a pool of available drivers, (ii) transmit to the selected driver a confirmation request for the ride request, and (iii) receive from the selected driver a confirmation notification indicative of that the selected driver has accepted the ride request.

In some embodiments, when the driver selection process is performed on the backend, a request may be generated and transmitted to a "tracker microservice" executed on the backend and which is tasked with managing information about the pool of drivers.

For example, the tracker microservice may have access to a large amount of data about driver vehicles such as their colour, brand, current location, and the like. In another example, the tracker microservice may have a local geo index for drivers and may be communicatively coupled with "routing services" executed on the backend for building routes from a point A to a point B (sometimes also including other specified intermediate points) for a ride request.

When a request is received by the tracker microservice to search for a candidate driver, the tracker microservice can determine a plurality of factors and use them for selecting a given candidate driver. The plurality of factors can include a first factor being indicative of the amount of time that it takes for a given vehicle to arrive at the pick-up location. The plurality of factors can include a second factor such as a value indicative of a level of "demand" at the pick-up location and/or the drop-off location. The plurality of factors can include a third factor such a value indicative of a level of "experience" of a given driver.

In some embodiments, the tracker microservice may be configured to "batch" ride requests and perform driver assignment between the batch of ride requests and a respective pool of candidate drivers currently available for performing rides. It is contemplated that a plurality of tracker microservices may be implemented on the backend and associated with respective pools of candidate drivers, without departing from the scope of the present technology.

Developers of the present technology have realized that some existing ridesharing platforms often greedily select the nearest driver to the pick-up location of a ride request. Without wishing to be bound to any specific theory, developers have devised methods and servers that allow selection of drivers for ride requests in a manner that further reduces a number of vehicular accidents involving selected drivers.

In some embodiments of the present technology, a server is configured to generate scores for respective "driver-request" pairs for a driver (from a pool of available drivers) and a ride request (from a batch of current ride requests) received by the server. The server may make use of these scores as inputs into a dispatching algorithm for selecting a subset of driver-request pairs for assigning candidate drivers to current ride requests. In some embodiments, the dispatching algorithm executed by the server may be implemented similarly to a Hungarian algorithm. Broadly speaking, the Hungarian algorithm involves generating all independent sets of a cost matrix, computing the total costs of each assignment and a search of all assignments to find a minimal-sum independent set.

In the context of the present technology, developers have a devised methods and servers for training a Machine Learning Algorithm (MLA) to generate at least one of the plurality of factors considered by the dispatching algorithm.

In some embodiments of the present technology, training data for training the MLA may be generated by a server based on historical data stored by the online platform. For example, the server may access a list of previously performed rides by drivers of the online platform. Data associated with a given previously performed ride may include route-specific information, driver-specific information, and temporal information. The route-specific information may be indicative of a pick-up location, drop-off location, a plurality of route segments, a number of accidents that have occurred on respective route segments, and the like. The driver-specific information may be indicative of an age of the driver, a number of years of experience of the driver, a number of accidents in which the driver has been involved previously to accepting the given previously performed ride, and the like. The temporal information may be indicative of events occurring from a moment in time corresponding to the acceptance of the previous preformed ride, during the previously performed ride, and following completion of the previously performed ride.

It is contemplated that the server may generate training datasets for respective training driver-request pairs. The training dataset may include a training input and a training label. The training input comprises a driver score generated for a given driver, and a route score generated for a corresponding previously performed ride/route. For example, a given driver score may be computed based on driver-specific information. In another example, a given route score may be computed based on route-specific information. The training label may be indicative of whether the driver from the training driver-request pair has been involved in an accident within a pre-determined interval of time following the acceptance of the route from the training driver-request pair, and/or following a moment in time at which the driver picks up the user and initiates the corresponding route.

In some implementations, the pre-determined interval of time is one hour. For example, the training label for a given training input may be a first value if the driver has been involved in an accident within the pre-determined interval of time and a second value if the driver has not been involved in an accident within the pre-determined interval of time.

It is contemplated that the pre-determined interval of time may be larger or smaller than the interval of time that it required to actually perform the corresponding route. For example, if the driver has completed the corresponding route, has been involved in an accident after that, but the accident still occurred within the pre-determined interval of time, the training label is still indicative of the driver in the given driver-request pair being involved in the accident within the pre-determined interval of time. In some embodiments, the pre-determined interval can be said to be independent from the route length of a specific route and/or the amount of time that it actually takes to perform the specific route.

In some embodiments, it is contemplated that using an interval-specific training label may be beneficial during a training phase of the MLA. Developers of the present technology have realized that if the training label is indicative of whether a given driver has been involved in an accident while performing the corresponding route (i.e. without the pre-determined time limitation, such as one hour), shorter routes that require less time for completion will be prioritized to longer routes because there is a higher likelihood of being involved in accidents on longer routes than on shorter routes.

In other embodiments, the MLA may be employed during its in-use phase to generate scores for all possible pairs of (i) ride requests from a current batch of ride requests, and (ii) candidate drivers from a pool of currently available drivers. It should be noted that dispatching algorithm that performs pair selection, such as a Hungarian algorithm, for example, may need pair-based inputs for respective pairs to be analysed, and selecting best-matched pairs.

It should be noted that the pair-based scores generated by the MLA may be one of many factors considered by the dispatching algorithm. This means that other pair-based inputs may be provided to the dispatching algorithm such as a dispatch time for a given driver-request pair, for example. As a result, in addition to considering how quickly a driver from a given pair can arrive at the pick-up location associated with a route from the given pair, the dispatching algorithm is also configured to consider the likelihood of the driver being involved in an accident within the pre-determined interval of time if the driver from the pair accepts the route from the pair.

In a first broad aspect of the present technology, there is provided a method of generating a prediction score by a Machine Learned Algorithm (MLA), the MLA being executed by a server, the server executing an digital transportation service, the server being configured to be communicatively coupled to a plurality of electronic devices associated with respective users and respective drivers of the digital transportation service, the method executable by the server, the method comprising: acquiring, by the server, route data associated with a plurality of routes requested by users of the digital transportation service; generating, by the server, a plurality of route scores for the plurality of routes based on the route data, a given route score being indicative of how safe a respective route from the plurality of routes is; acquiring, by the server, driver data associated with a plurality of drivers of the digital transportation service; generating, by the server, a plurality of driver scores for the plurality of drivers based on the driver data, a given driver score being indicative of a driving behavior of the respective driver from the plurality of drivers; for a given pair including the given route and the given driver: generating, by the server employing the MLA, a given prediction score indicative of a likelihood of the given driver having an accident on the given route within a predetermined amount of time after initiating the given route; assigning, by the server employing a dispatching algorithm, the given route to the given driver for providing a transportation service to the user, the assigning being based on the prediction score.

In some embodiments of the method, the generating the route score comprises generating, by the server, a ratio of accidents on the route over a route length of the route.

In some embodiments of the method, the generating the driver score comprises generating, by the server employing a driver model, the driver score based on driver behavioral data and driver profile data.

In some embodiments of the method, the method further comprises generating, by the server, a dispatch time value for the given pair, and the assigning is further based on the dispatch time value.

In some embodiments of the method, the MLA is a logistic regression model.

In some embodiments of the method, the MLA is a pairwise ranking model.

In some embodiments of the method, the dispatching algorithm is Hungarian algorithm.

In a second broad aspect of the present technology, there is provided a method of dispatching a driver to a ride request, the method executable by a server, the server executing an digital transportation service, the server being configured to be communicatively coupled to a plurality of electronic devices associated with respective users and respective drivers of the digital transportation service, the method comprising: acquiring, by the server, route data associated with a plurality of routes requested by users of the digital transportation service, a given route from the plurality of routes being associated with a respective ride request; generating, by the server, a plurality of route scores for the plurality of routes based on the route data, the given route score being indicative of how safe a respective route from the plurality of routes is; acquiring, by the server, driver data associated with a plurality of drivers of the digital transportation service; generating, by the server, a plurality of driver scores for the plurality of drivers based on the driver data, a given driver score being indicative of a driving behavior of the respective driver from the plurality of drivers; for a given pair including the given route and the given driver: generating, by the server employing the MLA, a given prediction score indicative of a likelihood of the given driver having an accident on the given route within a predetermined amount of time after initiating the given route; assigning, by the server employing a dispatching algorithm, the given route to the given driver for providing a transportation service to the user, the assigning being based on the prediction score; and transmitting, by the server, a request for confirmation to the given driver for accepting the given route.

In a third broad aspect of the present technology, there is provided a server for generating a prediction score by a Machine Learned Algorithm (MLA), the MLA being executed by the server, the server executing an digital transportation service, the server being configured to be communicatively coupled to a plurality of electronic devices associated with respective users and respective drivers of the digital transportation service, the server being configured to: acquire route data associated with a plurality of routes requested by users of the digital transportation service; generate a plurality of route scores for the plurality of routes based on the route data, a given route score being indicative of how safe a respective route from the plurality of routes is; acquire driver data associated with a plurality of drivers of the digital transportation service; generate a plurality of driver scores for the plurality of drivers based on the driver data, a given driver score being indicative of a driving behavior of the respective driver from the plurality of drivers; for a given pair including the given route and the given driver: generate, by employing the MLA, a given prediction score indicative of a likelihood of the given driver having an accident on the given route within a predetermined amount of time after initiating the given route; assign, by employing a dispatching algorithm, the given route to the given driver for providing a transportation service to the user, the assigning being based on the prediction score.

In some embodiments of the server, to generate the route score comprises the server configured to generate a ratio of accidents on the route over a route length of the route.

In some embodiments of the server, to generate the driver score comprises the server configured to generate, by employing a driver model, the driver score based on driver behavioral data and driver profile data.

In some embodiments of the server, the server is further configured to generate a dispatch time value for the given pair, and the assigning is further based on the dispatch time value.

In some embodiments of the server, the MLA is a logistic regression model.

In some embodiments of the server, the MLA is a pairwise ranking model.

In some embodiments of the server, the dispatching algorithm is Hungarian algorithm.

In the context of the present specification, a "server" is a computer program that is running on appropriate hardware and is capable of receiving requests (e.g. from client devices) over a network, and carrying out those requests, or causing those requests to be carried out. The hardware may be implemented as one physical computer or one physical computer system, but neither is required to be the case with respect to the present technology. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "electronic device" is any computer hardware that is capable of running software appropriate to the relevant task at hand. In the context of the present specification, the term "electronic device" implies that a device can function as a server for other electronic devices and client devices, however it is not required to be the case with respect to the present technology. Thus, some (non-limiting) examples of electronic devices include personal computers (desktops, laptops, netbooks, etc.), smart phones, and tablets, as well as network equipment such as routers, switches, and gateways. It should be understood that in the present context the fact that the device functions as an electronic device does not mean that it cannot function as a server for other electronic devices. The use of the expression "an electronic device" does not preclude multiple client devices being used in receiving/sending, carrying out or causing to be carried out any task or request, or the consequences of any task or request, or steps of any method described herein.

In the context of the present specification, "client device" is any computer hardware that is capable of running software appropriate to the relevant task at hand. In the context of the present specification, in general the term "client device" is associated with a user of the client device. Thus, some (non-limiting) examples of client devices include personal computers (desktops, laptops, netbooks, etc.), smart phones, and tablets, as well as network equipment such as routers, switches, and gateways It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, etc.

In the context of the present specification, the expression "software component" is meant to include software (appropriate to a particular hardware context) that is both necessary and sufficient to achieve the specific function(s) being referenced.

In the context of the present specification, the expression "computer information storage media" (also referred to as "storage media") is intended to include media of any nature and kind whatsoever, including without limitation RAM, ROM, disks (CD-ROMs, DVDs, floppy disks, hard drivers, etc.), USB keys, solid state-drives, tape drives, etc. A plurality of components may be combined to form the computer information storage media, including two or more media components of a same type and/or two or more media components of different types.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first database" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware components, in other cases they may be different software and/or hardware components.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

These and other features, aspects and advantages of the present technology will become better understood with regard to the following description, appended claims and accompanying drawings where:

DETAILED DESCRIPTION

Figure 1:
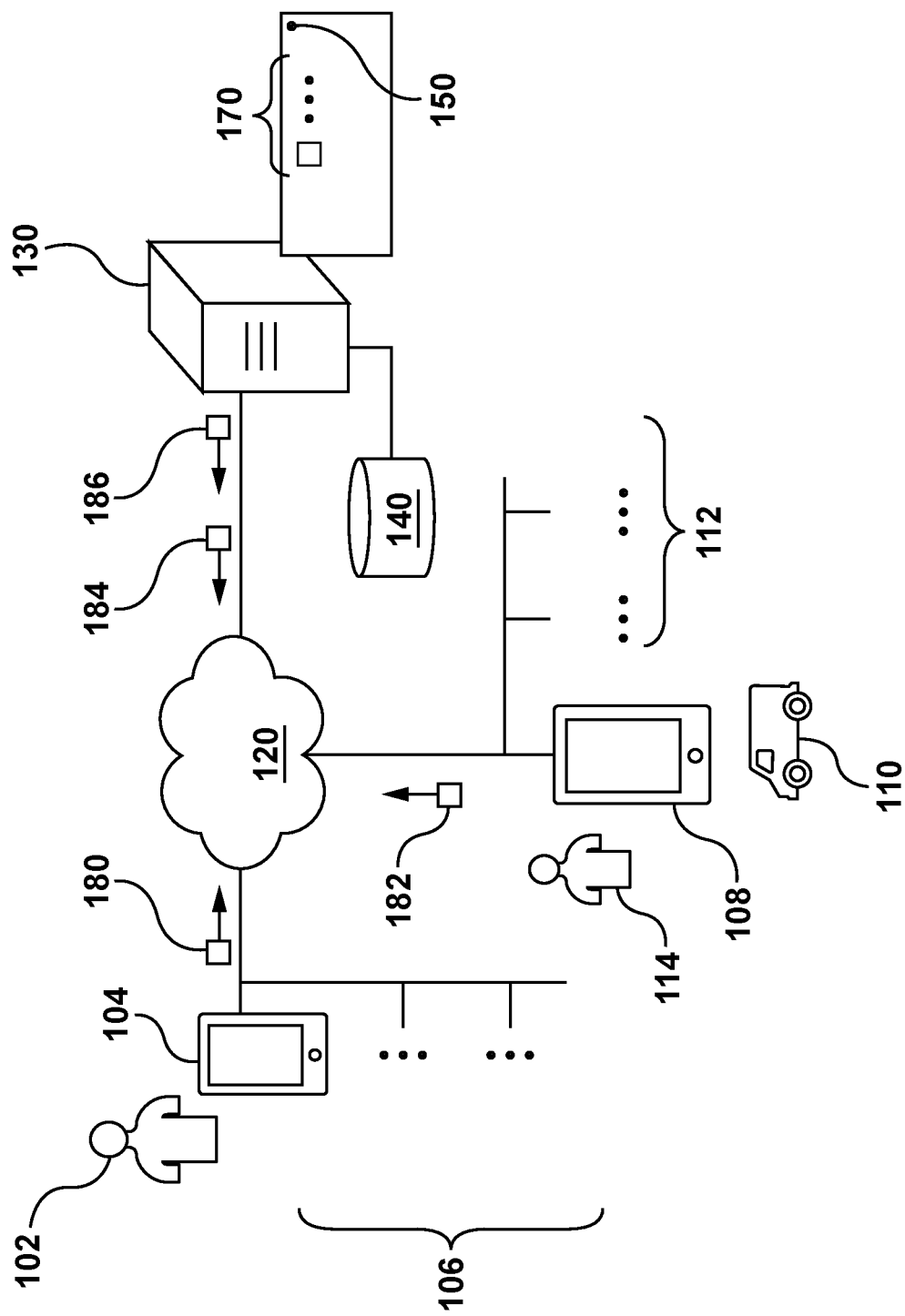
FIG. 1 is a schematic representation of a system for dispatching drivers to users of an digital transportation service, as envisioned in some embodiments of the present technology.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labelled as a "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

With reference to FIG. 1 there is depicted a schematic representation of a system 100 as contemplated in some embodiments of the present technology. The system 100 comprises a plurality of passenger devices 106 associated with a plurality of passenger users. For example, the plurality of passenger devices 106 comprises a passenger device 104 associated with a passenger user 102. The system 100 comprises a plurality of driver devices 112 associated with a plurality of drivers and respective vehicles. For example, the plurality of driver devices 112 comprises a driver device 108 associated with a respective driver 114 and a respective vehicle 110.

The system 100 comprises a server 130 and a storage device 140 associated with the server 130. The server 130 may make use of data stored by the storage device 140 for hosting a transportation e-service 150. The server 130 is communicatively coupled with the plurality of passenger devices 106 and the plurality of driver devices 112 over a communication network 120. The server 130 is configured to receive information 180 from the plurality of passenger devices 106, and information 182 from the plurality of driver devices 112. The server 130 may employ a plurality of algorithms 170 for processing the information 180 and 182 and/or information accessible from the database 140. The server 130 is configured to send information 184 to the plurality of passenger devices 106, and information 186 to the plurality of driver devices 112. Content of the information 180, 182, 184, and 186 will become apparent from the description herein further below.

The passenger device 104 and/or the driver device 108 comprises various hardware components including one or more single or multi-core processors, a solid-state drive, a memory, which may be a random-access memory or any other type of memory. Communication between the various components of the passenger device 104 and/or the driver device 108 may be enabled by one or more internal and/or external buses (not shown) (e.g. a PCI bus, universal serial bus, IEEE 1394 "Firewire" bus, SCSI bus, Serial-ATA bus, etc.), to which the various hardware components are electronically coupled. According to embodiments of the present technology, the solid-state drive stores program instructions suitable for being loaded into the memory and executed by the processor for executing software applications. For example, the program instructions may be part of a software application executable by the processor. It is noted that the passenger device 104 and/or the driver device 108 may have additional and/or optional components, such as a network communication module for communication, via the communication network 120 with other electronic devices and/or servers, and the like.

Passenger Device

The passenger device 104 may include suitable logic, circuitry, interfaces, and/or code, executable by the circuitry, that may be configured to perform one or more operations for initiating ride requests. The passenger device 104 may be utilized by the passenger 102 to initiate a ride request for booking a vehicle to travel from a pick-up location to a drop-off location. The passenger device 104 may be configured to run a software application, associated with the server 130, that allows the passenger 102 to initiate the ride request. The passenger device 104 may be configured to display various booking and notification interfaces that are rendered by the server 130 by way of the software application. For example, the passenger device 104 may be configured to display a booking interface that allows the passenger 102 to provide ride information and consents that are required for initiating the ride request. The passenger device 104 may be further configured to communicate the ride request to the server 130 over the communication network 120. The passenger device 104 may be utilized, by the passenger 102, to view allocation information received from the server 130. The allocation information notifies the passenger 102 of a vehicle that is allocated to the ride request. Examples of the passenger device 104 may include, but are not limited to, a personal computer, a laptop, a smartphone, and a tablet computer.

In some embodiments, the server 130 may be configured to render a booking interface on the display of the passenger device 104 by way of the software application that runs on the passenger device 104. The booking interface may enable the passenger 104 to initiate the ride request.

In some embodiments, the booking interface may present a geographical map and a first set of selectable options to the passenger 102. The first set of selectable options may include text boxes, a navigation cursor, a 'ride now' button, a 'ride later' button, a current-location detection button, and a distance scale, and the live. The text boxes may be used by the passenger 102 to enter addresses of the pick-up and drop-off locations, respectively, in textual format. The navigation cursor may be moved around the geographical map by way of touch-inputs provided by the passenger 102 on the passenger device 104 and used to pin the pick-up and drop-off locations on the geographical map. The 'ride now' button 310 may be selected by the passenger 102 when the passenger 102 wants to initiate the ride request for scheduling a ride immediately. The 'ride later' button may be selected by the passenger 102 when the passenger 102 wants to initiate the ride request for scheduling the ride for a particular time in future. The current-location detection button, when selected, may move the navigation cursor, to a real-time location of the passenger device 104. The distance scale may be used by the passenger 102 to zoom in to or zoom out of the geographical map. Additional options may be selected by the passenger 102 in the booking interface such as a baby seat, for example, without departing from the scope of the present technology.

Driver Device

The driver device 108 may include suitable logic, circuitry, interfaces and/or code, executable by the circuitry, that may be configured to run the software application hosted by the server 130. In one embodiment, when the server 130 allocates the vehicle 110 and the driver 114 to the ride request of the passenger 102, the driver device 108 may be configured to receive the allocation information from the server 130. Based on the allocation information, the driver device 108 may be configured to display a navigation interface to guide the driver 114 to reach the pick-up location for picking up the passenger 102 in the vehicle 110. The navigation interface may be further configured to present a route between the pick-up location and the drop-off location to guide the driver 114 to reach the drop-off location from the pick-up location for dropping the passenger 102. The driver device 108 may be further configured to track a real-time location of the vehicle 110 and communicate information of the tracked real-time location to the server 130. The driver device 108 may be further configured to communicate sensor data of one or more sensors (not shown) on the vehicle 110 to the application server 130. Examples of the one or more sensors may include, but are not limited to, accelerometer, odometer, traffic sensor, global positioning sensor (GPS), temperature sensor, cameras, or the like.

In some embodiments, the server 130 may be configured to render a notification interface on the display of the driver device 108 by way of the software application that runs on the driver device 108. The notification interface may enable the driver 114 to view a message that includes information about the ride when the server 130 allocates the driver 114 to the ride request initiated by the passenger 102.

In some embodiments, the information about the ride may include passenger name, number of seats booked, pick-up location, drop-off location, pick-up time, estimated drop-off time, ride fare, and the like. The notification interface may further include a navigation map showing the pick-up location, the drop-off location, and an estimated route from the pick-up location 'to the drop-off location. The notification interface may further include a plurality of options, such as a "confirm booking" option and a "reject booking" option, selectable by the driver 114. The "confirm booking" option may be selected by the driver 114 when the driver 114 wants to confirm the ride request. The "reject booking" option may be selected by the driver 114 when the driver 114 wants to reject the ride request. The server 130 may be configured to allocate another vehicle to the ride request when the "reject booking" option is selected by the driver 114.

Communication Network

In some embodiments of the present technology, the communication network 120 is the Internet. In alternative non-limiting embodiments, the communication network 120 can be implemented as any suitable local area network (LAN), wide area network (WAN), a private communication network or the like. It should be expressly understood that implementations of the communication network 120 are for illustration purposes only. How a communication link (not separately numbered) between the passenger device 104 and/or the driver device 108 and the communication network 120 is implemented will depend inter alia on how the passenger device 104 and/or the driver device 108 is implemented. Merely as an example and not as a limitation, in those non-limiting embodiments of the present technology where the passenger device 104 and/or the driver device 108 is implemented as a wireless communication device such as a smartphone or a navigation device, the communication link can be implemented as a wireless communication link. Examples of wireless communication links include, but are not limited to, a 3G communication network link, a 4G communication network link, and the like. The communication network 120 may also use a wireless connection with the server 130.

Storage

Figure 2:
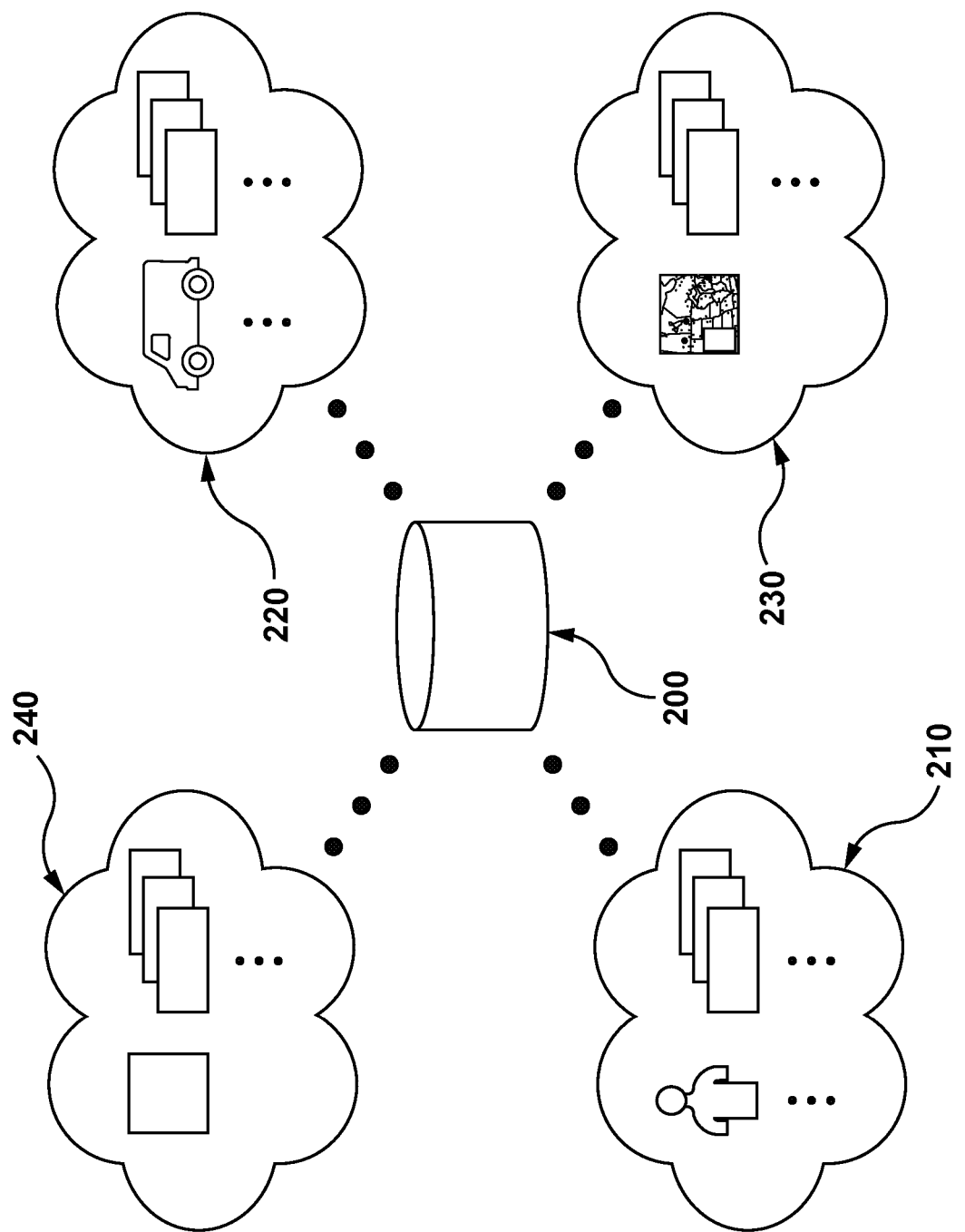
FIG. 2 is a schematic representation of data stored in a storage of the system of FIG. 1, as envisioned in some embodiments of the present technology.

With reference to FIG. 2, there is depicted a schematic representation of the storage 140. In some embodiments, the storage 140 is communicatively coupled to the server 130. In other embodiments, the storage 140 may be communicatively coupled to the passenger device 104 and/or the driver device 108 and/or any other processor of communicatively coupled to the communication network 120.

The storage 140 is configured to store information extracted, determined and/or generated by the server 130 and/or the passenger device 104 and/or the driver device 108. Generally speaking, the storage 140 may receive data generated by the server 130 and/or the passenger device 104 and/or the driver device 108 during processing for temporary and/or permanent storage thereof and may provide stored data to the server 130 and/or the passenger device 104 and/or the driver device 108 for use thereof. It is contemplated that the storage 140 may be split into several distributed storages, for providing a fault-tolerant storage system for example, without departing from the scope of the present technology.

It should be noted that in at least some embodiments of the present technology, the storage 140 is configured to store a database. Broadly, the storage 140 may store an organized collection of data. Small databases can be stored on a file system, while large databases are hosted on computer clusters or cloud storage. The design of a database may depend on inter alia various techniques and practical considerations, including data modelling, efficient data representation and storage, query languages, security and privacy of sensitive data, and distributed computing issues, including supporting concurrent access and fault tolerance.

In the non-limiting embodiment of FIG. 2, the storage 140 stores user data 210, driver data 220, map data 230, and training data 240. The user data 210 comprises user-specific information associated with a plurality of passenger users of the online platform. The driver data 220 comprises driver-specific information associated with a plurality of driver users of the online platform. The map data 230 comprises map-specific information associated with a geographical region in which the online platform operates. The training data 240 comprises information indicative of a plurality of training datasets that can be used by the server 130 for training one or more Machine Learning Algorithms (MLAs). The content of the user data 210, the driver data 220, the map data 230 and the training data 240 will become apparent from the description herein further below.

Server

The server 130 may include suitable logic, circuitry, interfaces, and/or code, executable by the circuitry, that may be configured to perform one or more operations (e.g., execution of programs, routines, scripts, or the like stored in a memory) for vehicle allocation. The server 130 may be configured to host the software application (for example, a mobile application or a web application) that may run on the passenger device 104. The server 130 may be configured to receive the ride request from the passenger device 104 over the communication network 120. Based on the ride request, the server 130 may be configured to select and allocate a suitable vehicle (for example, the vehicle 110) to the ride request. The server 130 may be further configured to communicate the allocation information to the passenger device 104 for notifying the passenger 102 of the allocation of the vehicle. The server 130 may be realized through various web-based technologies, such as, but not limited to, a Java web-framework, a .NET framework, a PHP (Hypertext Preprocessor) framework, or any other web-application framework. Examples of the server 130 may include, but are not limited to, a personal computer, a laptop, or a network of computer systems.

The server 130 can be implemented as a conventional computer server and may comprise a processor and a memory. In one non-limiting example, the server 130 is implemented as a Dell™ PowerEdge™ Server running the Microsoft™ Windows Server™ operating system but can also be implemented in any other suitable hardware, software, and/or firmware, or a combination thereof. In the depicted non-limiting embodiments of the present technology, the server is a single server. In alternative non-limiting embodiments of the present technology (not shown), the functionality of the server 130 may be distributed and may be implemented via multiple servers.

In some non-limiting embodiments of the present technology, the passenger device 104 and/or the driver device 108 can be in communication with the server 130 to receive one or more updates. The updates can be, but are not limited to, software updates, map updates, routes updates, weather updates, and the like. In some embodiments of the present technology, the passenger device 104 and/or the driver device 108 can also be configured to transmit to the server 130 certain operational data, such as routes travelled, traffic data, performance data, and the like.

The server 130 may execute a plurality of algorithms 170 for hosting the transportation service 150. In some embodiments, the plurality of algorithms 170 may allow the server 130 to perform a variety of functionalities including, but not limited to: vehicle detection, data mining, vehicle deployment, allocation, and communication, data management and storage operations.

In some embodiments of the present technology, the processor of the server 130 may include suitable logic, circuitry, interfaces, and/or codes, executable by the circuitry, that may be configured to perform one or more operations for vehicle allocation. For example, the processor may be configured to control and manage detection of vehicles for the ride request by using a vehicle detection module of the server 130 and retrieval of requisite information from storage 140 by using a data mining module of the server 130. The processor may be further configured to control (i) deployment of the vehicles by using a vehicle deployment module of the server 130 and (ii) rendering of booking and/or notification interfaces on the passenger device 104 and/or the driver device 108 by using a notification module of the server 130. The processor may be further configured to control and manage selection and allocation of drivers to the ride request by using an allocation module of the server 130.

It is contemplated that the processor may be configured to instruct the vehicle detection module, the data mining module, the vehicle deployment module, the notification module, and the allocation module to perform corresponding operations either independently or in conjunction with each other. Examples of the processor may include, but are not limited to, an application-specific integrated circuit (ASIC) processor, a reduced instruction set computing (RISC) processor, a complex instruction set computing (CISC) processor, and a field-programmable gate array (FPGA). It will be apparent to a person skilled in the art that the processor is compatible with multiple operating systems.

In some embodiments of the present technology, the memory of the server 130 may include suitable logic, circuitry, interfaces, and/or codes, executable by the circuitry, that may be configured to store one or more instructions executable by the processor, the vehicle detection module, the data mining module, the vehicle deployment module, the notification module, and the allocation module. The memory may be configured to temporarily store the historical travel data, the historical driving data, the passenger information, the driver information, and/or the vehicle information retrieved from the server 130. The memory may be further configured to store the ride request initiated by the passenger 102. Examples of the memory may include, but are not limited to, a random-access memory (RAM), a read-only memory (ROM), a programmable ROM (PROM), and an erasable PROM (EPROM)

In some embodiments of the present technology, the vehicle detection module may include suitable logic, circuitry, interfaces, and/or codes, executable by the circuitry, that may be configured to execute one or more vehicle detection operations. In one non-limiting example, the vehicle detection module may be configured to detect available drivers/vehicles that are present within a threshold distance from the pick-up location (e.g., the first location 'A') specified in the ride request. The available vehicles may be detected based on corresponding real-time locations obtained from the driver device 108 (and/or a vehicle-integrated device). The vehicle detection module may be implemented by one or more processors, such as, but are not limited to, an ASIC processor, a RISC processor, a CISC processor, and/or an FPGA.

In some embodiments of the present technology, the data mining module may include suitable logic, circuitry, interfaces, and/or codes, executable by the circuitry, that may be configured to execute one or more data mining operations. For example, the data mining module may be configured to retrieve the historical travel data and the historical driving data from the storage 140 based on the ride request and store the historical travel data and the historical driving data in the memory of the server 130 and/or the storage 140. The data mining module may be further configured to retrieve the passenger information, the driver information, and/or the vehicle information from the storage 140 based on the ride request and store the passenger information, the driver information, and/or the vehicle information in the memory. The data mining module may be configured to obtain the sensor data from the driver device 108, and/or a vehicle-integrated device associated with the vehicle 110. The data mining module may be further configured to obtain a current status of an ongoing ride and store the current status in the memory. The data mining module may be implemented by one or more processors, such as, but not limited to, an ASIC processor, a RISC processor, a CISC processor, and an FPGA.

In some embodiments of the present technology, the notification module may include suitable logic, circuitry, interfaces, and/or codes, executable by the circuitry, that may be configured to execute one or more operations for rendering the booking and notification interfaces on the passenger device 104 and the driver device 108. For example, the notification module may be configured to render booking interfaces and notification interfaces on the passenger device 104 by way of the software application that runs on the passenger device 104. The booking interfaces and notification interfaces may be graphical user interfaces (GUIs) that may allow the passenger 102 to interact with the server 130 for initiating the ride request. The notification module may be implemented by one or more processors, such as, but not limited to, an ASIC processor, a RISC processor, a CISC processor, and an FPGA.

In some embodiments of the present technology, the allocation module may include suitable logic, circuitry, interfaces, and/or codes, executable by the circuitry, that may be configured to perform one or more operations for vehicle selection and allocation. For example, the allocation module may be configured to select and allocate the driver 114 to the ride request of the passenger 102 based on a plurality of factors. The allocation module may be implemented by one or more processors, such as, but not limited to, an ASIC processor, a RISC processor, a CISC processor, and an FPGA.

In some embodiments of the present technology, a transceiver may include suitable logic, circuitry, interfaces, and/or codes, executable by the circuitry, that may be configured to transmit (or receive) data to (or from) various servers or devices, such as the passenger device 104, the driver device 108, the storage 140, or the like over the communication network 120. Examples of the transceiver may include, but are not limited to, an antenna, a radio frequency transceiver, a wireless transceiver, and a Bluetooth transceiver. The transceiver may be configured to communicate using various wired and wireless communication protocols, such as TCP/IP, UDP, LTE communication protocols, or any combination thereof.

In some embodiments, the server 130 may include suitable logic, circuitry, interfaces and/or code, executable by the circuitry, that may be configured to perform one or more data management and storage operations. For example, the database server 130 may be configured to manage and store historical travel data of passengers (e.g., the passenger 102), who have travelled in one or more vehicles deployed by the transport provider, and historical driving data of drivers (e.g., the driver 114), who drive various vehicles deployed by the transport provider. The historical travel data of the passenger 102 may be indicative of the details of rides taken by the passenger 102 on the vehicles deployed the transport provider, in the past. The details of the rides taken by the passenger 102 may include historical pick-up and drop-off locations, a frequency of rides between the historical pick-up and drop-off locations, preferences of the passenger 102 for one or more vehicle types (e.g., autonomous, manual, or self-driven), or the like. The historical driving data of the driver 114 may be indicative of the details of rides that were allocated to the driver 114 by server 130, in the past. The details of the rides allocated to the driver 114 may include historical pick-up and drop-off locations, duration of each ride, working hours of the driver 114, or any other travel data. The historical travel data and the historical driving data may be stored in the storage 140 by the server 130.

In other embodiments, the server 130 may be further configured to manage and store passenger information of the passengers (e.g., the passenger 102), driver information of the drivers (e.g., the driver 114), and vehicle information of the vehicles (e.g., the vehicle 110) that are deployed by the transport provider. The passenger information of the passenger 102 may include at least a name, a contact number, an e-mail address, or other related information of the passenger 102. The driver information of the driver 114 may include a name, a contact number, an e-mail address, an identity proof, a nominal driving pattern, and/or other related information of the driver 114. In one example, where the driver 114 owns the vehicle 110 deployed by the transport provider, the driver information of the driver 114 may further include a vehicle number of the vehicle 110. The vehicle information of the vehicle 110 may include registered numbers, colors, models, and/or other related information of the vehicle 110.

Dispatching Procedure

Figure 3:
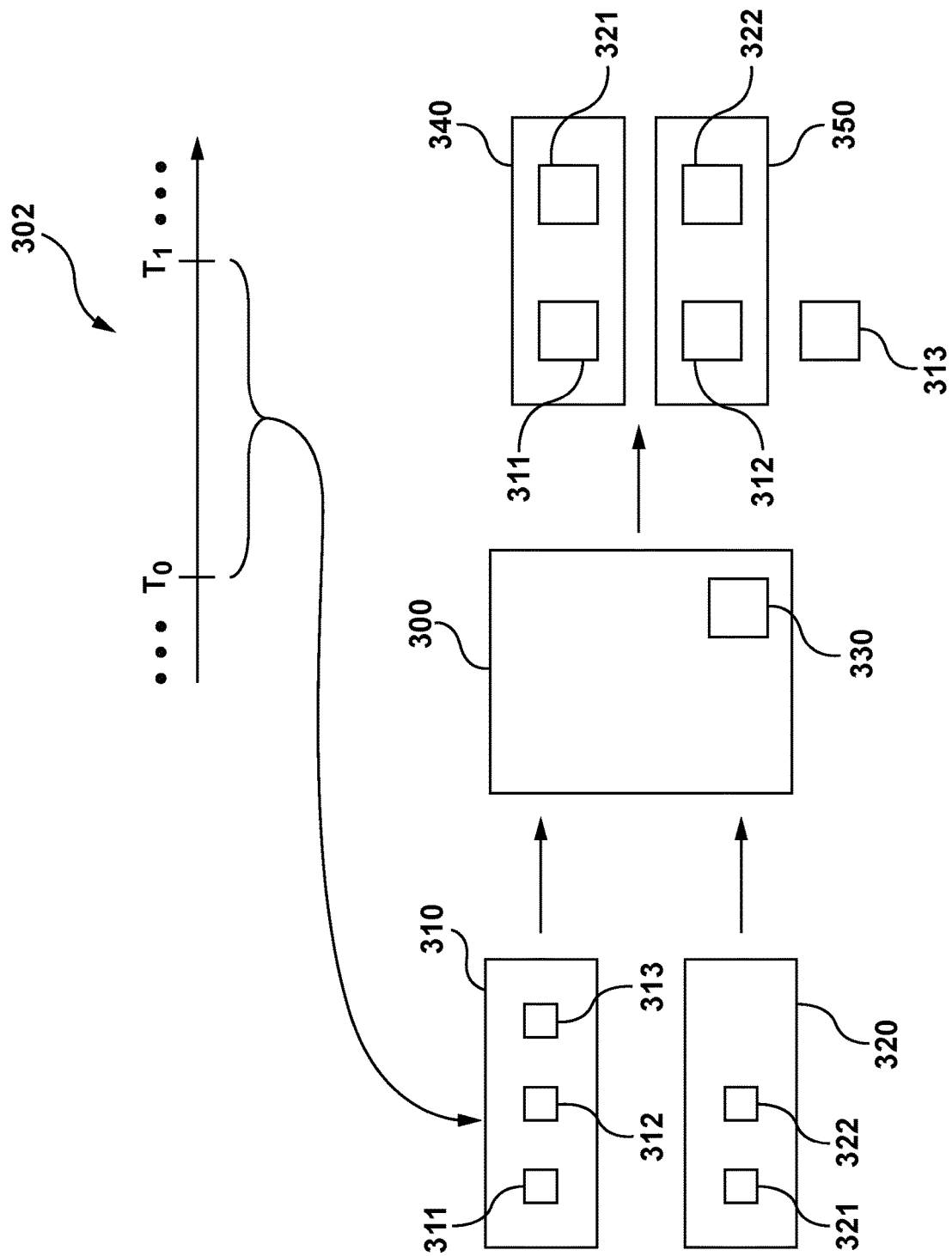
FIG. 3 illustrates a real-time dispatching cycle performed by the system of FIG. 1, as envisioned in some embodiments of the present technology.

With reference to FIG. 3, there is depicted a schematic representation of a real-time dispatching cycle. Let it be assumed that the server 130 receives during an interval of time 302 a batch of requests 320. The batch of requests 320 includes a first request 321 and a second request 322. The server 130 is configured to match requests from the batch of request 320 with available drivers from a pool of drivers. As illustrated, the server 130 may be configured to match requests from the batch of requests 320 with drivers from a batch of drivers 310. The batch of drivers 310 includes a first driver 311, a second driver 312, and a third driver 313. It is contemplated that the server 130 may pre-select which drivers from the pool of drivers are to be included in the batch of drivers 310, for example, based on geographic proximity or the like.

The server 130 is configured to use a dispatching algorithm 300 to determine which request from the batch of requests 320 is to be assigned to which driver from the batch of drivers 310. To that end, the dispatching algorithm 300 may be configured to assign request to drivers based on a plurality of factors (criteria) 330.

In some embodiments of the present technology, it can be said that the dispatching algorithm 300 is configured to receive input data for all possible respective request-driver pairs and output data indicative of assigned request-driver pairs as determined based on the plurality of factors 330. It is contemplated that the dispatching algorithm 300 can be implemented as a Hungarian algorithm without departing from the scope of the present technology.

In the non-limiting example illustrated in FIG. 3, the server 130 is configured to determine a first dispatch pair 340 including the first driver 311 with the first request 321, and a second dispatch pair 350 including the second driver 312 with the second request 322. Also, the server 130 may identify the third driver 313 as a non-assigned driver for the current real-time dispatching cycle.

As it will be described in greater details herein further below, developers have devised methods and systems which may reduce a total number of accidents in which assigned drivers are involved. In some embodiments of the present technology, there is provided a method and a server for training and/or using a Machine Learning Algorithm (MLA) to predict at least one factor from the plurality of factors 330 and which allows matching more "risky" requests with more "reliable" drivers and/or less "risky" requests with less "reliable" drivers. It can also be said that given routes/requests with route scores indicative of low safety are more likely to matched with drivers with driver scores indicative of high reliability.

MLA

Generally speaking, MLAs can learn from and make predictions on data. MLAs are usually used to first build a model based on training inputs of data in order to then make data-driven predictions or decisions expressed as outputs, rather than following static computer-readable instructions. MLAs are commonly used as estimation models, ranking models, classification models and the like.

MLAs can have different structures and topologies adapted for inter alia solving specific tasks. Some MLAs may be implemented as Neural Network (NNs). Generally speaking, a given NN consists of an interconnected group of artificial "neurons", which process information using a connectionist approach to computation. NNs are used to model complex relationships between inputs and outputs (without actually knowing the relationships) or to find patterns in data. NNs are first conditioned in a training phase in which they are provided with a known set of "inputs" and information for adapting the NN to generate appropriate outputs (for a given situation that is being attempted to be modelled). During this training phase, the given NN adapts to the situation being learned and changes its structure such that the given NN will be able to provide reasonable predicted outputs for given inputs in a new situation (based on what was learned). Thus rather than try to determine complex statistical arrangements or mathematical algorithms for a given situation; the given NN tries to provide an "intuitive" answer based on a "feeling" for a situation. NNs are commonly used in many such situations where it is only important to know an output based on a given input, but exactly how that output is derived is of lesser importance or is unimportant. For example, NNs are commonly used to optimize the distribution of web-traffic between servers and in data estimation, data processing, including filtering, clustering, vector embedding and the like.

In some embodiments of the present technology, the server 130 may employ an MLA using a CatBoost library in combination with a logistical regression technique. Broadly, the CatBoost library that is an open-source software library developed by Yandex™ that provides a gradient boosting framework which, amongst other features, attempts to solve for categorical features using a permutation driven alternative compared to other classical algorithm.

Figure 4:
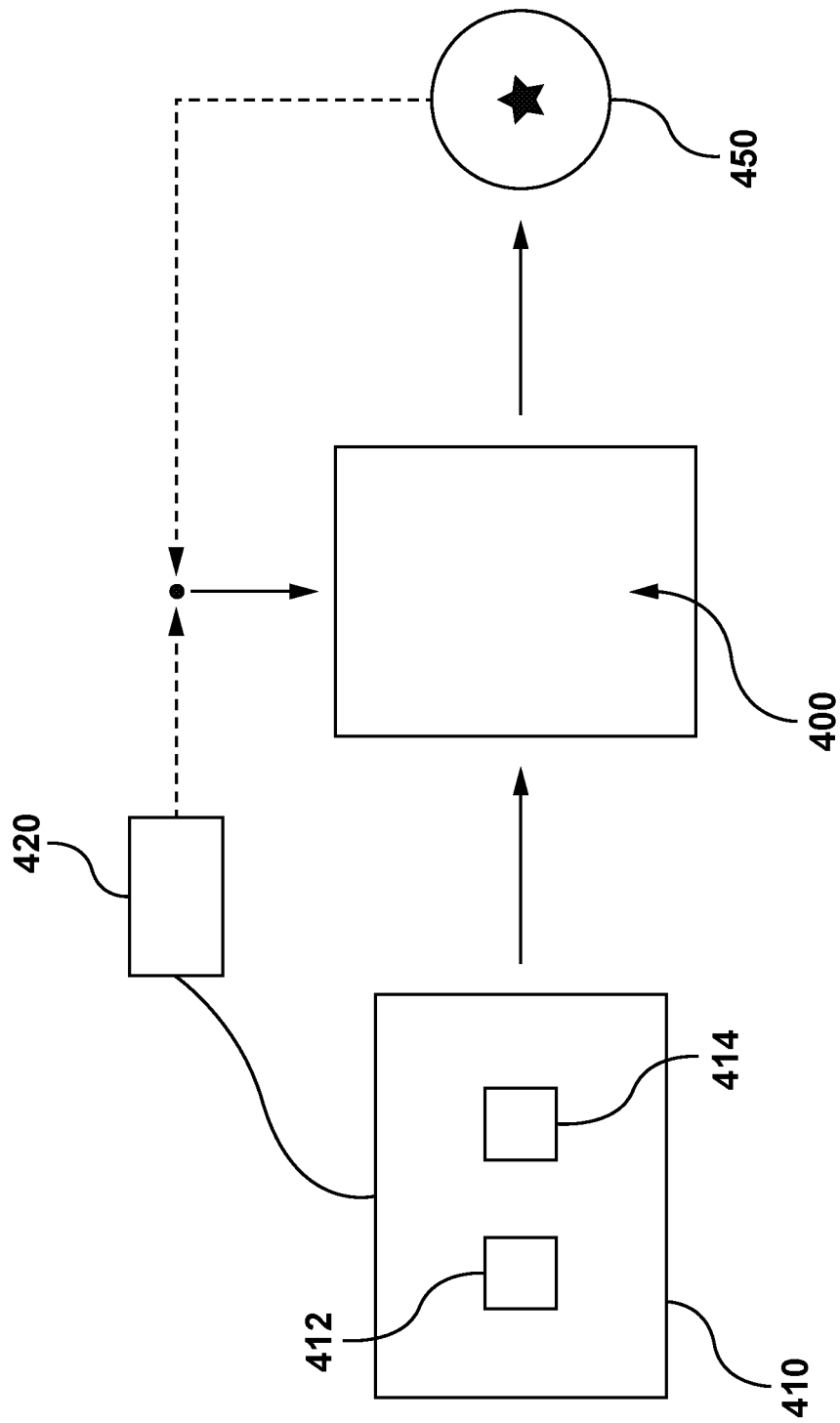
FIG. 4 illustrates a single training iteration of a Machine Learning Algorithm (MLA) used by the system of FIG. 1, as envisioned in some embodiments of the present technology.

With reference to FIG. 4, there is depicted a single training iteration of an MLA 400 to predict scores for respective request-driver pairs. The server 130 is configured to generate a training input 410 for a respective training request-driver pair. The training input 410 comprises a driver score 412 associated with the training driver from the training request-driver pair and a route score 414 associated with the training request/route from the training request-driver pair. Data for generating the training input 410 can be retrieved by the server 130 from the storage 140.

The server 130 is configured to generate the driver score 412 based on driver-specific information. The driver score 412 may be indicative of driving behaviour of the driver. In some embodiments, the server 130 may be configured to employ a driver model to generate the driver score 412 based on driver behavioural data and driver profile data. It is contemplated that accident history of the driver can be used by the driver model for generating the driver score 412.

In some embodiments of the present technology, driver-specific features may be indicative of at least some of: a number of years of driving experience, a pre-determined level of driving experience, user ratings associated with previous rides performed by the driver, driving style of the driver determined based on vehicle data (e.g, from accelerometer), a parameter indicative of how often the driver exceeds the speed limit, other user signals indicative of dangerous driving, and age of the vehicle driven by the driver.

The server 130 is configured to generate the route score 414 based on route-specific information. In some embodiments, the server 130 may be configured to generate a ratio of accidents on the route over a route length of the route. The server 130 may also be configured to generate such ratios for respective segments of the route, and generate the route score 414 as a combination of such segment scores.

The server 130 is configured to generate a label 420 for the training input 410. Data for generating the label 420 can be retrieved by the server 130 from the storage 140. The label is indicative of whether the driver from the training request-driver pair has been involved in an accident within a pre-determined interval of time after initiating the route from the training request-driver pair.

In some implementations, the pre-determined interval of time is one hour. For example, the label 420 for the training input 410 may be a first value if the training driver has been involved in an accident within the pre-determined interval of time and a second value if the training driver has not been involved in an accident within the pre-determined interval of time.

It is contemplated that the pre-determined interval of time may be larger or smaller than the interval of time that it required to actually perform the training route. For example, if the training driver has completed the training route, has been involved in an accident after that, but the accident occurred within the pre-determined interval of time, the training label is still indicative of the driver in the given driver-request pair being involved in the accident within the pre-determined interval of time. In some embodiments, the pre-determined interval can be said to be independent from the route length of a specific route and/or the amount of time that it actually takes to perform the specific route.

In some embodiments, it is contemplated that using an interval-specific training label may be beneficial during a training phase of the MLA 400. Developers of the present technology have realized that if the training label is indicative of whether a given driver has been involved in an accident while performing the corresponding route, shorter routes that require less time for completion will be prioritized to longer routes because there is a higher likelihood of being involved in accidents on longer routes than on shorter routes.

The MLA 400 is configured to generate a training prediction score 450 based on the training input 410. The server 130 may compare the training prediction score 450 against the label 420. The server 130 may use the comparison in order to train the MLA 400 to generate scores for in-use request-driver pairs during real-time dispatching cycles.

In summary, in some embodiments of the present technology, training data for training the MLA 400 can be generated by the server 130 based on data retrieved from the storage 140. For example, the server 130 may determine a list of previously executed requests (and corresponding routes) by drivers of the online platform. The server 130 can generate for a given training request-driver pair a driver score and a route score based on the data retrieved from the storage 140. In some embodiments, a request score may be determined as a combination of route-specific features and the driver score may be determined as a combination of driver-specific features. In other embodiments, the server 130 may make use of driver-specific features and a driver model for generating the driver score and of route-specific features and a route model for generating the route score. The server 130 may generate a label based on temporal information associated with the given training request-driver pair. For example, the server 130 may generate a first value for the label if the driver has been involved in an accident within a pre-determined interval of time after initiating the request. It should be noted that the pre-determined interval of time may begin (i) at a moment when the server 130 receive a confirmation notification from a driver device indicative of that the driver has accepted the route, and/or (ii) at a moment when the server 130 receives an indication of that a passenger has been pick-up at the corresponding pick-up location. The MLA is thus trained to predict for the given request(route)-driver pair a prediction score indicative of how likely a given driver with a given score is to be involved in an accident within the pre-determined interval of time after initiating a given request including a given route with a given route score.

In some embodiments, it is contemplated that using an interval-specific training label may be beneficial during a training phase of the MLA. Developers of the present technology have realized that if the training label is indicative of whether a given driver has been involved in an accident while performing the corresponding route (i.e. without the pre-determined time limitation, such as one hour), shorter routes that require less time for completion will be prioritized to longer routes because there is a higher likelihood of being involved in accidents on longer routes than on shorter routes.

Figure 5:
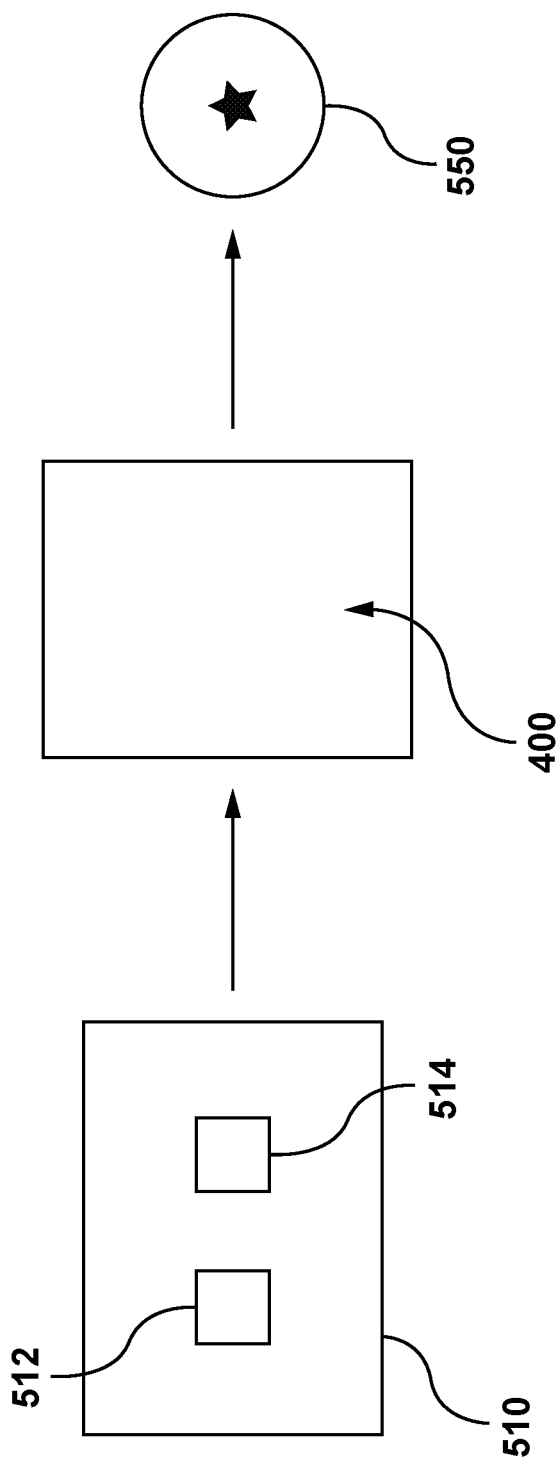
FIG. 5 illustrates a single in-use iteration of the MLA of FIG. 4, as envisioned in some embodiments of the present technology.

With reference to FIG. 5, there is depicted a single in-use iteration of the MLA 400. The server 130 is configured to generate a current candidate request-driver pair 510 including a given request/route from the batch of requests 320 (see FIG. 3) and a given driver from the batch of driver 310 (see FIG. 3). The server 130 is configured to generate a driver score 512 for the given driver similarly to how the server 130 generates the driver score 412 during training, and to generate a route score 514 for the given route similarly to how the server 130 generates the route score 414 during training.

The driver score 512 and the route score 514 are inputted into the now-trained MLA 400 that is configured to generate an in-use prediction score 550 for the respective in-use request-driver pair. The server 130 is configured to use the prediction score 550 as part of the plurality of factors 330 (see FIG. 3) based on which the dispatching algorithm 300 is to assign target request-driver pairs.

Let it be assumed that amongst the batch of driver 310, the most reliable driver is the first driver, the less reliable driver is the third driver, and the second driver is in between the most reliable and the less reliable driver. Let it also be assumed that amongst the batch of requests 320, the most safe route is associated with the second request 322, and the less safe route is associated with the first request 321. In this scenario, the server 130 may generate a plurality of factors for all possible request-driver pairs, and select the first request-driver pair 340 including the most reliable driver and the less safe route, and the second request-driver pair 350 including the less reliable driver and the most safe route. It is also contemplated that the server 130 may determine the second driver 313 as being a non-matched driver. The non-matched driver can be made available by the server 130 for the then next real-time dispatching cycle.

In summary, in some embodiments of the present technology, the dispatching algorithm 300 is configured to analyse all potential request-driver pairs from a current batch of requests and a current batch of drivers. It should be noted that the dispatching algorithm 300 is optimized based on the plurality of factors for determining which ones amongst all the potential request-driver pairs are to be assigned request-driver pairs. It is contemplated that in some embodiments, in addition to optimizing the dispatching algorithm 300 for reducing dispatch time of drivers to passengers, the dispatching algorithm 300 is also optimized for reducing a total number of accidents involving drivers based on pair-specific prediction scores generated by the MLA 400.

Figure 6:
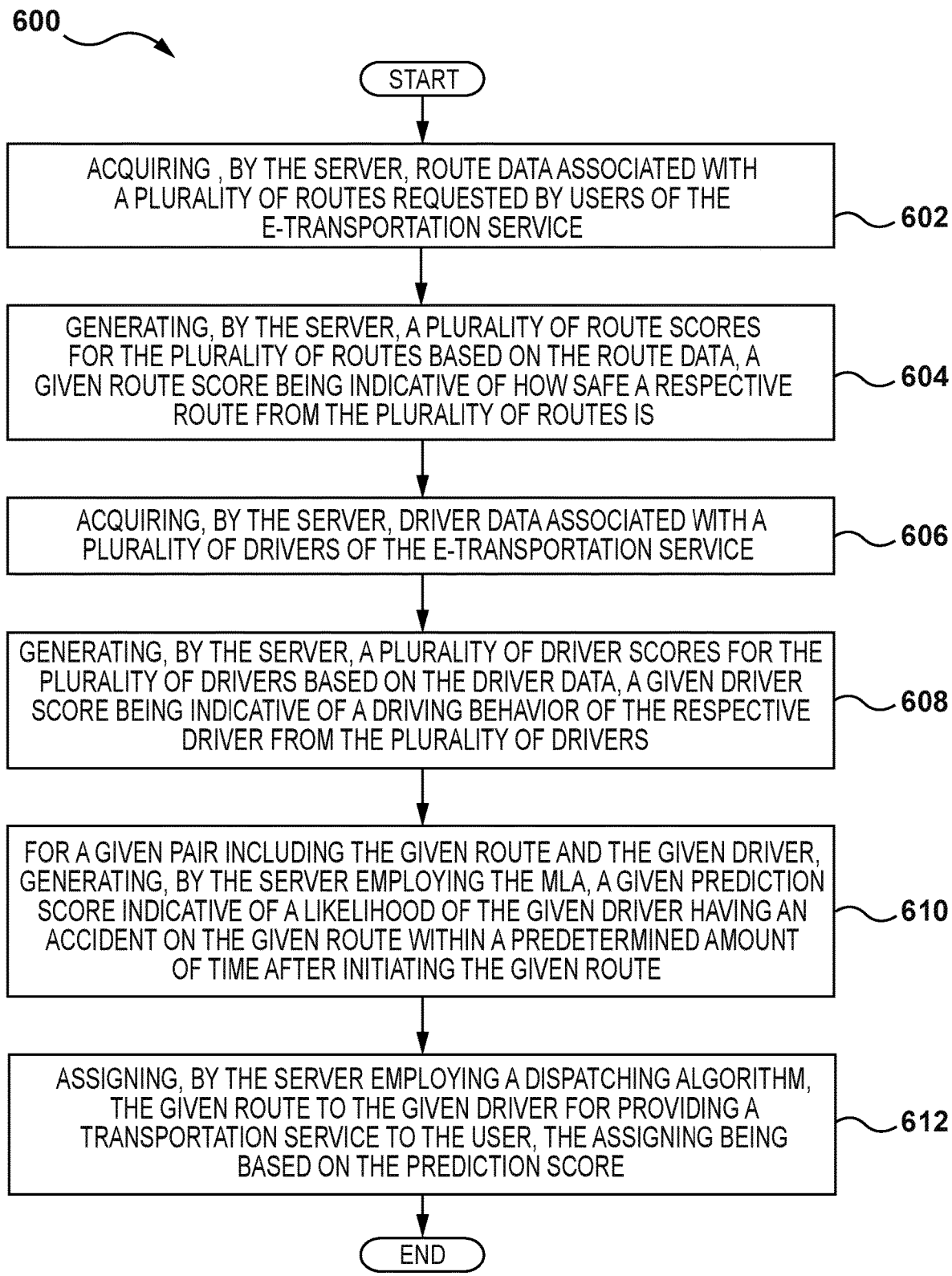
FIG. 6 is a scheme-block representation of a method performed by a server of the system of FIG. 1, as envisioned in some embodiments of the present technology.

With reference to FIG. 6, there is depicted a scheme-block representation of a method 600 performed by the server 130 from FIG. 1. Various steps of the method 600 will now be discussed in detail.

STEP 602: Acquiring, by the Server, Route Data Associated with a Plurality of Routes Requested by Users of the Digital Transportation Service The method 600 begins at step 602 with the server 130 acquiring route data associated with a plurality of routes requested by users of the digital transportation service. The route data may be acquired from the storage device 140. The route data may be identified based on a batch of ride requests currently queued for dispatch. It should be noted that a given ride request may be associated with one or more respective routes.

STEP 604: Generating, by the Server, a Plurality of Route Scores for the Plurality of Routes Based on the Route Data, a Given Route Score being Indicative of how Safe a Respective Route from the Plurality of Routes is The method 600 continues to step 604 with the server 130 generating a plurality of route scores for the plurality of routes based on the route data. A given route score, such as the route score 514 for example, is indicative of how safe a respective route from the plurality of routes is.

For example, the server 130 is configured to generate the route score 414 based on route-specific information. In some embodiments, the server 130 may be configured to generate a ratio of accidents on the route over a route length of the route. The server 130 may also be configured to generate such ratios for respective segments of the route, and generate the route score 414 as a combination of such segment scores.

STEP 606: Acquiring, by the Server, Driver Data Associated with a Plurality of Drivers of the Digital Transportation Service The method 600 continues to step 606 with the server 130 acquiring driver data associated with a plurality of drivers requested by users of the digital transportation service. The driver data may be acquired from the storage device 140. The driver data may be identified based on a batch of drivers that are available on the digital transportation service.

STEP 608: Generating, by the Server, a Plurality of Driver Scores for the Plurality of Drivers Based on the Driver Data, a Given Driver Score being Indicative of a Driving Behavior of the Respective Driver from the Plurality of Drivers The method 600 continues to step 608 with the server 130 generating a plurality of driver scores for the plurality of drivers based on the driver data. A given driver score, such as the driver score 512 for example, is indicative of a driving behavior of the respective driver from the plurality of drivers.

For example, the server 130 is configured to generate the driver score 412 based on driver-specific information. The driver score 412 may be indicative of driving behaviour of the driver. In some embodiments, the server 130 may be configured to employ a driver model to generate the driver score 412 based on driver behavioural data and driver profile data. It is contemplated that accident history of the driver can be used by the driver model for generating the driver score 412.

STEP 610: For a Given Pair Including the Given Route and the Given Driver, Generating, by the Server Employing the MLA, a Given Prediction Score Indicative of a Likelihood of the Given Driver Having an Accident on the Given Route within a Predetermined Amount of Time after Initiating the Given Route The method 600 continues to step 610 with the server 130 generating a prediction score for a given route-driver pair. For example, the server 130 may use the MLA 400 to generate for the pair 510 a prediction score 550. The prediction score 550 is indicative of a likelihood of the given driver has an accident on the given route within a predetermined amount of time after initiating the given route. In some embodiments, the MLA may be a logistic regression model. In other embodiments, the MLA may be a pairwise ranking model.

STEP 612: Assigning, by the Server Employing a Dispatching Algorithm, the Given Route to the Given Driver for Providing a Transportation Service to the User, the Assigning being Based on the Prediction Score The method 600 continues to step 612 with the server 130 assigning the given route to the given driver based on the prediction score. For example, the prediction score 550 may be used amongst other scores for the respective request-driver pair as an input for a dispatching algorithm. The dispatching algorithm may receive as input such a plurality of scores for all (or some) possible pairs of drivers and requests from a batch of drivers and a batch of requests. In some embodiments, the dispatching algorithm may be a Hungarian algorithm. In other embodiments, the dispatching algorithm may be configured to receive pair-based inputs for processing.

It should be expressly understood that not all technical effects mentioned herein need to be enjoyed in each and every embodiment of the present technology.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A method of generating a prediction score by a Machine Learned Algorithm (MLA), the MLA being executed by a server, the server executing an digital transportation service, the server being configured to be communicatively coupled to a plurality of electronic devices associated with respective users and respective drivers of the digital transportation service, the method executable by the server, the method comprising:
acquiring, by the server, route data associated with a plurality of routes requested by users of the digital transportation service;
generating, by the server, a plurality of route scores for the plurality of routes based on the route data, a given route score being indicative of how safe a respective route from the plurality of routes is;
acquiring, by the server, driver data associated with a plurality of drivers of the digital transportation service;
generating, by the server, a plurality of driver scores for the plurality of drivers based on the driver data, a given driver score being indicative of a driving behavior of the respective driver from the plurality of drivers;
for a given pair including the given route and the given driver:
generating, by the server employing the MLA, a given prediction score indicative of a likelihood of the given driver having an accident on the given route within a predetermined amount of time after initiating the given route;
assigning, by the server employing a dispatching algorithm, the given route to the given driver for providing a transportation service to the user, the assigning being based on the prediction score.

2. The method of claim 1, wherein the generating the route score comprises generating, by the server, a ratio of accidents on the route over a route length of the route.

3. The method of claim 1, wherein the generating the driver score comprises generating, by the server employing a driver model, the driver score based on driver behavioral data and driver profile data.

4. The method of claim 1, wherein the method further comprises generating, by the server, a dispatch time value for the given pair, and wherein the assigning is further based on the dispatch time value.

5. The method of claim 1, wherein the MLA is a logistic regression model.

6. The method of claim 1, wherein the MLA is a pairwise ranking model.

7. The method of claim 1, wherein the dispatching algorithm is a Hungarian algorithm.

8. A method of dispatching a driver to a ride request, the method executable by a server, the server executing an digital transportation service, the server being configured to be communicatively coupled to a plurality of electronic devices associated with respective users and respective drivers of the digital transportation service, the method comprising:
acquiring, by the server, route data associated with a plurality of routes requested by users of the digital transportation service, a given route from the plurality of routes being associated with a respective ride request;
generating, by the server, a plurality of route scores for the plurality of routes based on the route data, the given route score being indicative of how safe a respective route from the plurality of routes is;
acquiring, by the server, driver data associated with a plurality of drivers of the digital transportation service;
generating, by the server, a plurality of driver scores for the plurality of drivers based on the driver data, a given driver score being indicative of a driving behavior of the respective driver from the plurality of drivers;
for a given pair including the given route and the given driver:
generating, by the server employing the MLA, a given prediction score indicative of a likelihood of the given driver having an accident on the given route within a predetermined amount of time after initiating the given route;
assigning, by the server employing a dispatching algorithm, the given route to the given driver for providing a transportation service to the user, the assigning being based on the prediction score; and
transmitting, by the server, a request for confirmation to the given driver for accepting the given route.

9. A server for generating a prediction score by a Machine Learned Algorithm (MLA), the MLA being executed by the server, the server executing an digital transportation service, the server being configured to be communicatively coupled to a plurality of electronic devices associated with respective users and respective drivers of the digital transportation service, the server being configured to:
acquire route data associated with a plurality of routes requested by users of the digital transportation service;
generate a plurality of route scores for the plurality of routes based on the route data, a given route score being indicative of how safe a respective route from the plurality of routes is;
acquire driver data associated with a plurality of drivers of the digital transportation service;
generate a plurality of driver scores for the plurality of drivers based on the driver data, a given driver score being indicative of a driving behavior of the respective driver from the plurality of drivers;

for a given pair including the given route and the given driver:

generate, by employing the MLA, a given prediction score indicative of a likelihood of the given driver having an accident on the given route within a predetermined amount of time after initiating the given route;

assign, by employing a dispatching algorithm, the given route to the given driver for providing a transportation service to the user, the assigning being based on the prediction score.

10. The server of claim 9, wherein to generate the route score comprises the server configured to generate a ratio of accidents on the route over a route length of the route.

11. The server of claim 9, wherein to generate the driver score comprises the server configured to generate, by employing a driver model, the driver score based on driver behavioral data and driver profile data.

12. The server of claim 9, wherein the server is further configured to generate a dispatch time value for the given pair, and wherein the assigning is further based on the dispatch time value.

13. The server of claim 9, wherein the MLA is a logistic regression model.

14. The server of claim 9, wherein the MLA is a pairwise ranking model.

15. The server of claim 9, wherein the dispatching algorithm is a Hungarian algorithm.

* * * * *